Oct. 31, 1961 A. C. JACKSON ET AL 3,007,022
COMPACT PRESSURE INDUCTION WELDING APPARATUS
FOR PORTABLE AND OTHER USE
Filed Dec. 9, 1959 8 Sheets-Sheet 1

INVENTORS
Alonzo C. Jackson
John H. Hunt
Leo A. Maier, Jr.
BY C. F. Bryant
ATTORNEY

INVENTORS
Alonzo C. Jackson
John H. Hunt
Leo A. Maier, Jr.

BY C.F.Bryant
ATTORNEY

United States Patent Office 3,007,022
Patented Oct. 31, 1961

3,007,022
COMPACT PRESSURE INDUCTION WELDING APPARATUS FOR PORTABLE AND OTHER USE
Alonzo C. Jackson, Chattanooga, Tenn., John H. Hunt, Massapequa Park, N.Y., and Leo A. Maier, Jr., Chattanooga, Tenn., assignors to Combustion Engineering, Inc., New York, N.Y., a corporation of Delaware
Filed Dec. 9, 1959, Ser. No. 858,544
8 Claims. (Cl. 219—9.5)

This invention relates to the welding of metal bodies by the aid of electrical energy inductively transmitted thereto, and it has special utility in connection with butt welding the ends of metal tubes through employment of high frequency electrical induction to heat the tube end metal to welding temperature.

Broadly stated, the object of this invention is to provide compact and otherwise improved apparatus for butt welding tube ends by induction heating in the general manners disclosed by Patent 2,542,393 issued February 20, 1951 to E. C. Chapman under title of "Apparatus for Welding" and by Patent 2,649,521, issued August 18, 1953 to E. C. Chapman and R. E. Lorentz under title of "Butt Welding Tube Ends by Induction Heating."

A more specific object is to increase the portability of and reduce the physical space which is occupied by such pressure induction welding apparatus.

Another object is to provide compact and portable apparatus of the named type which is adaptable for successful use at the site of field installations as well as in the fabrication shop.

A further object is to incorporate the needed equipment components into a compact yet rugged shell which is of generally cylindrical shape and which occupies a minimum of physical space.

An additional object is to provide for the equipment a compact support table for containing the pressure welding shell assemblage plus the heating current transformer and mechanism adjustable in the several directions necessary to align the abutted tube ends.

Other objects and advantages of the invention will become apparent as the disclosure and description hereof proceeds.

Illustrative embodiments of the improved apparatus are shown in the accompanying drawings wherein.

*The welding facilities here disclosed*

Referring now to the drawings in further detail, a pair of pipe or tube ends which are to be butt welded together are shown at A and B as being encircled by an induction heating coil C—C' later to be described, with the line of the desired butt welding being indicated at 10. These tube ends are held in properly aligned position by left and right clamp blocks 12—12' and 14—14'. Both blocks are of a split construction, wherein the upper halves 12' and 14' are swingable at proper times upwardly and away from the lower halves 12 and 14 around the hinge points 16 and 17 (FIG. 11) of a surrounding shell 18—18'.

*The two-part shell organization*

Said shell 18—18' that encases these left and right clamp blocks 12—12' and 14—14' has the cylindrical shape shown and is of a split construction consisting of the lower half 18 and a cooperating upper half 18'. This two-part shell 18—18' is openable around the earlier mentioned hinge points 16—17 (see FIGS. 9, 11, and 12) at proper times.

The left clamp block 12—12' is secured inside the shell 18—18' in a fixed manner that prevents the block from moving axially with respect to the shell; the lower block half 12 being secured to the lower shell half 18 by bolts not shown, and the upper block half 12' being suspended from the upper shell half 18' via a shoulder bolt 26.

Figure 6:
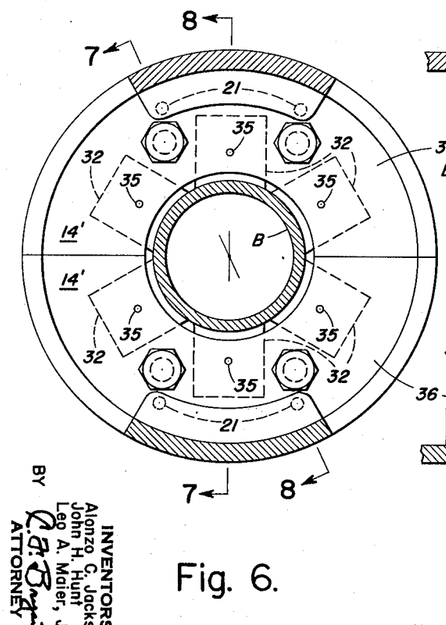
FIG. 6 is a section on line 6—6 of FIG. 1 showing further details of the six-segment clamp for gripping one of the tubes to be welded.
Figure 7:
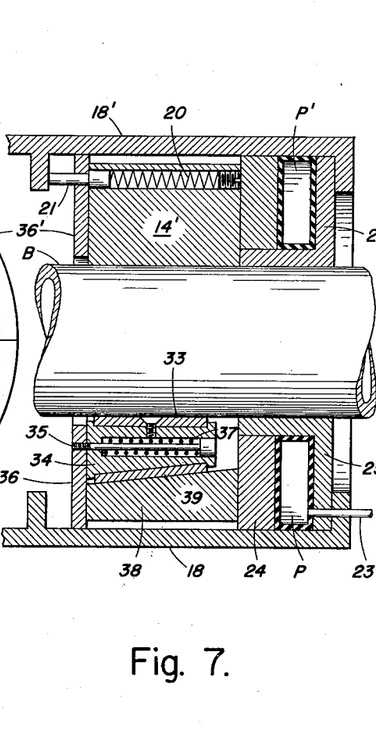
FIG. 7 is a section on line 7—7 of FIG. 6 showing the clamp before welding pressure is applied therethrough to the surrounded tube.
Figure 8:
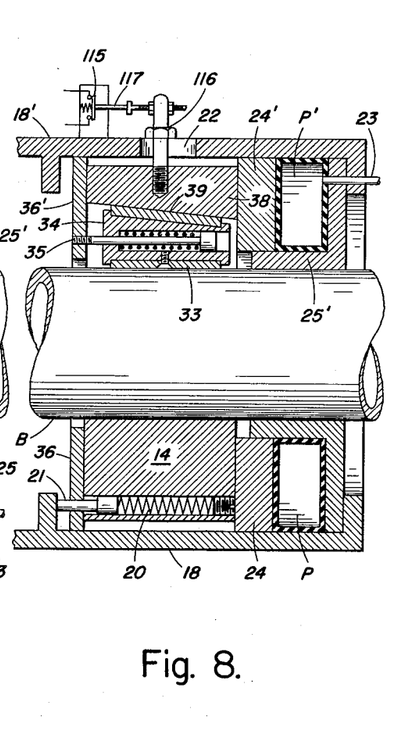
FIG. 8 is a view on line 8—8 of FIG. 6 which shows what happens in the FIG. 7 apparatus when pressure-producing movement is axially imparted to the six clamping segments thereof.

The right clamp block 14—14' however is carried inside the shell in a way which permits the block to move axially between the extreme right position shown in FIG. 7 and the left-shifted position shown in FIG. 8. Each of the block halves 14 and 14' is held to its associated shell half 18 and 18' in a way that permits sliding movement; a bolt 116 slidable in shell slot 22 (FIGS. 8–9) being used with the upper block half 14'. The four springs designated 20 in FIGS. 7 and 8 are respectively associated with the pins 21 of FIGS. 6-7-8 and serve to urge the block 14—14' toward the right or withdrawn position shown by FIG. 7.

Expansible envelope means P—P' for creating the weld pressure

At times however expansible envelopes or bellows P—P' housed in the extreme right end of shell 18—18' receive pressure fluid via conduits 23 and then force a ring 24 to the left into the advanced or left-shifted position of FIG. 8.

As best shown in FIGS. 5, 7, 8 and 9, the aforesaid expansible elements P—P' consist of similar lower and upper halves each of which takes the form of a hollow envelope made of rubber or other material which is both flexible and tough. Each of these rubber envelopes P—P' is of such size and shape as to fill the space provided therefor, as best shown in FIG. 7. Such space is bounded on the left by the movable ring 24 and on the right by a stationary part 25, while the inside of such space is defined by the axially extending portions of member 25 and the outside of such space is defined by the cylindrical wall of shell 18—18'.

In the absence of pressure fluid inside the envelopes P—P', the earlier mentioned springs 20 (FIGS. 7-8) hold the ring segments 24—24' to the right, as shown in FIG. 7. But when pressure fluid from the source 27 of FIG. 9 is admitted through valve 28 (with a companion valve 29 being closed) the rubber envelopes P—P' are expanded thereby and then push ring segments 24—24' to the left, as shown in FIG. 8.

Figure 1:
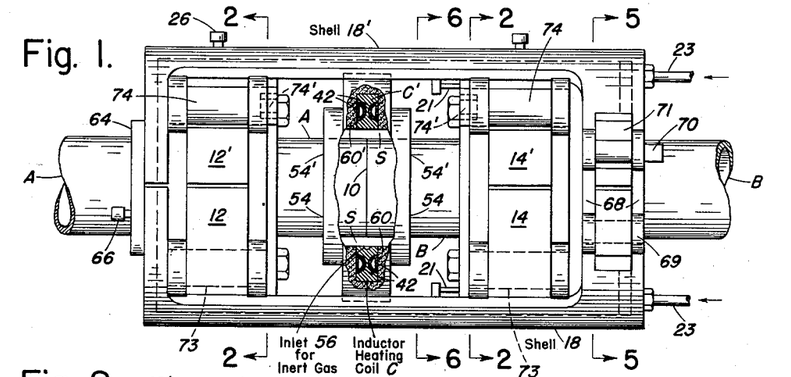
FIG. 1 is a view in front elevation showing our improved shell assemblage when same is installed around the abutted ends of two tubes that are to be welded together.
Figures 9, 10:
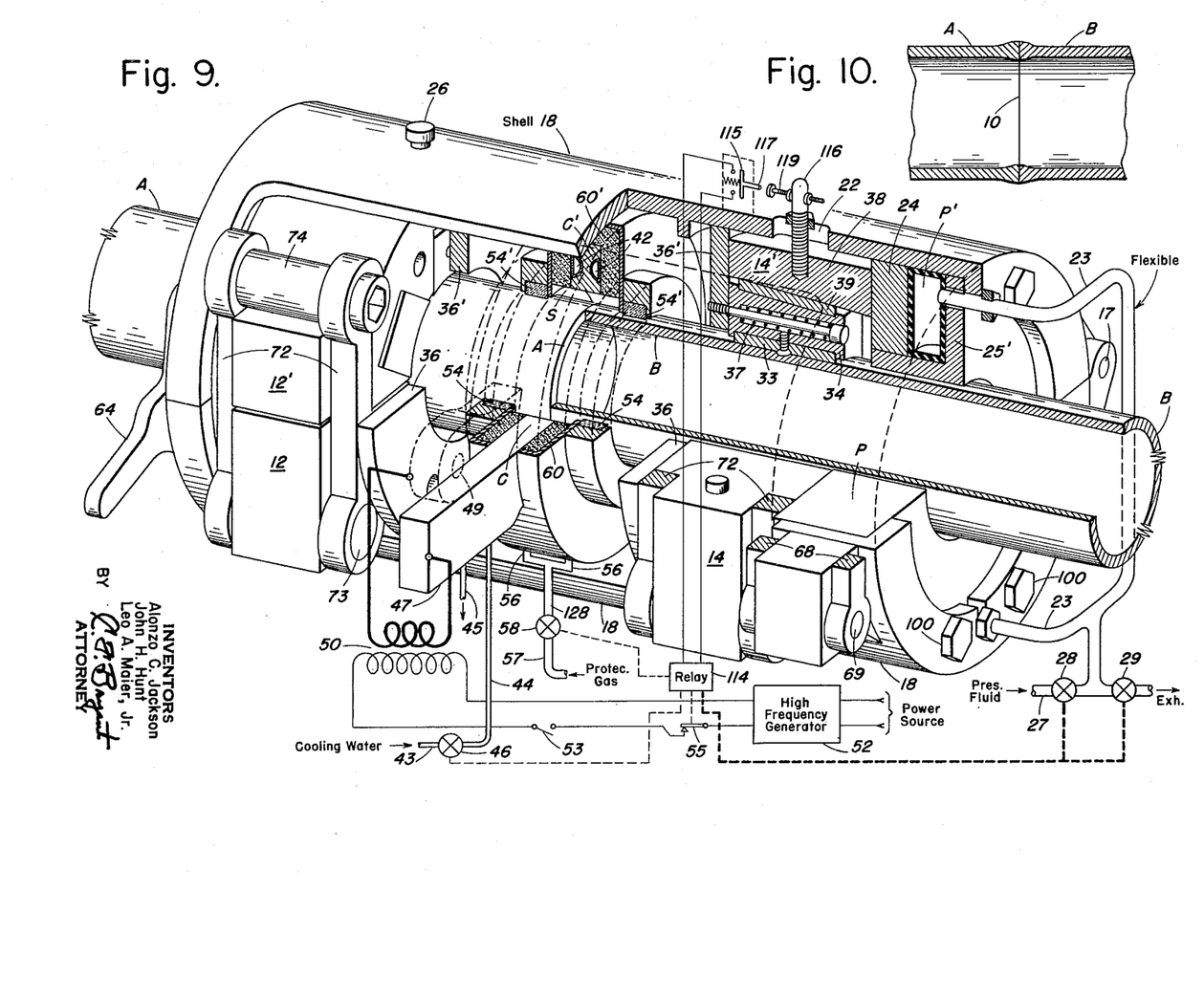
FIG. 9 is a view in isometric perspective of the FIG. 1 shell assemblage with parts broken away for greater clarity.
FIG. 10 is a representation in section of how the abutted tubes A and B appear after same have been welded together via the apparatus of FIGS. 1–9.

In this way there is created an axial force which in the apparatus of FIGS. 1 and 9 is sufficient to establish the required welding pressure between the abutted ends of tubes A and B. To release this force it is only necessary to close admission valve 28 (FIG. 9) while opening exhaust valve 29.

The left and right clamp blocks 12—12' and 14—14'

Figures 2, 3, 4, 5:
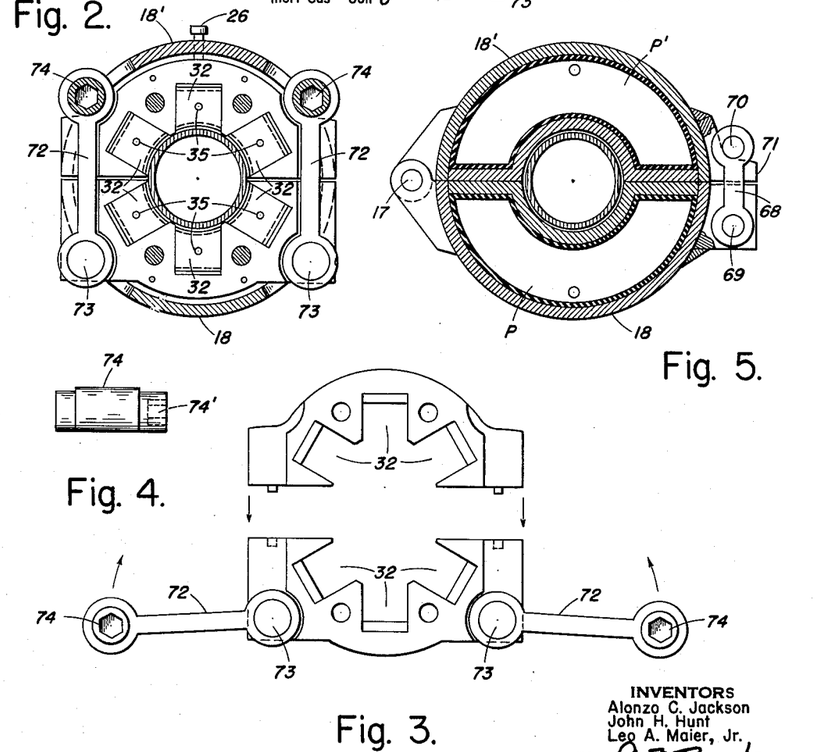
FIG. 2 is a sectional view on line 2—2 of FIG. 1 showing the improved construction of our new tube clamps.
FIG. 3 is an exploded view showing of the upper and lower portions of each of the left and right clamp sets before same are brought together in cooperating relationship.
FIG. 4 is a side view of the eccentric pins used at the top of each of the clamp-link sets.
FIG. 5 is a section on line 5—5 of FIG. 1 showing the pressure-applying envelopes as constructed of upper and lower parts that are openable in hinged manner.

In the invention embodiment shown, each of these clamping assemblages includes six circumferential segments designated 32 in each of FIGS. 2, 3 and 6. Three of these segments are carried by the lower clamp half while the remaining three are carried by the upper clamp half.

Each such segment includes a friction shoe 33 that bears against and frictionally engages the surrounded tube end A or B. Such shoe 33 is secured to a wedge element 34 that is movable axially with respect to a bolt 35, as best indicated in FIGS. 6-7-8. The ends of these six bolts as utilized in each clamp assemblage are threaded into plate segments 36—36' and each serve to hold those elements 34 in their proper places.

Each of these wedge elements 34 can at proper times be moved away from its holding plate 36—36' along the bolt 35 and against a compression spring 37. Cooperating with each such wedge element is a mating outer wedge member 38 which is similarly inclined and contact with which is established through intermediate slide part 39.

The complete wedge block organization just described is such that the shoes 33 of all six clamp segments 32 initially bear against the surrounded tube A or B with only moderate pressure. This condition is indicated in FIGS. 7 and 9.

With the tube ends A and B initially abutting as shown in FIGS. 1 and 9, the admission of pressure fluid into envelopes P—P' urges clamp block 14—14' to the left as shown in FIG. 8. In being communicated to tube B this movement urges that tube to the left against the abutting end of tube A. But tube B can move only a short distance to the left so that wedge members 38 slide along their contacting wedge elements 34 and intensify the compressive force of shoes 33 against the outside of tube B. This securely locks the clamp block to the tube, as shown in FIG. 8.

At the same time a similar action takes place on the part of clamp block 12—12' with respect to the left tube A. In consequence the expanding action of envelopes P—P' now becomes effective to set up between those tubes the abutting force that is needed to effect welding.

The inductor heating coil encircling the tube ends

Electrical energy for heating the end metal of aligned tubes A and B is transmitted thereto from an inductor coil made up of a lower half C and an openable top half C' which cooperates therewith so as to concentrically surround these abutting tube ends in the manner shown. The design of this coil C—C' forms the subject matter of a copending application Serial No. 858,543, filed December 9, 1959 in the name of A. C. Jackson under title of "Pressure Induction Welder Heating Coil Having Integral Flux Concentrators with Gas Chamber and Self Centering Means."

Such coil may satisfactorily be made of copper and the swingable top portion of C' (FIGS. 1, 9 and 11) is joined with the cooperating lower portion C to form the single continuous turn which FIGS. 1 and 9 represent.

To prevent this single-turn coil C from overheating, each of the two sections thereof is provided with inner passages 42 through which a cooling fluid may be passed. Water at room temperature or below from a suitable source marked 43 in FIG. 9 may satisfactorily be used as such cooling fluid. In an actual installation this cooling water will be passed into connections 44 and out of connections 45 (FIGS. 9 and 11) by means of flexible rubber tubing (not here shown) or the like under the control of a water admission valve 46 (FIG. 9).

The inner portion of this induction coil C—C' is made somewhat larger than the surrounded tube ends A and B so as to provide between the coil and the tube metal a small radial clearance such as about three-sixteenths inch.

Figure 11:
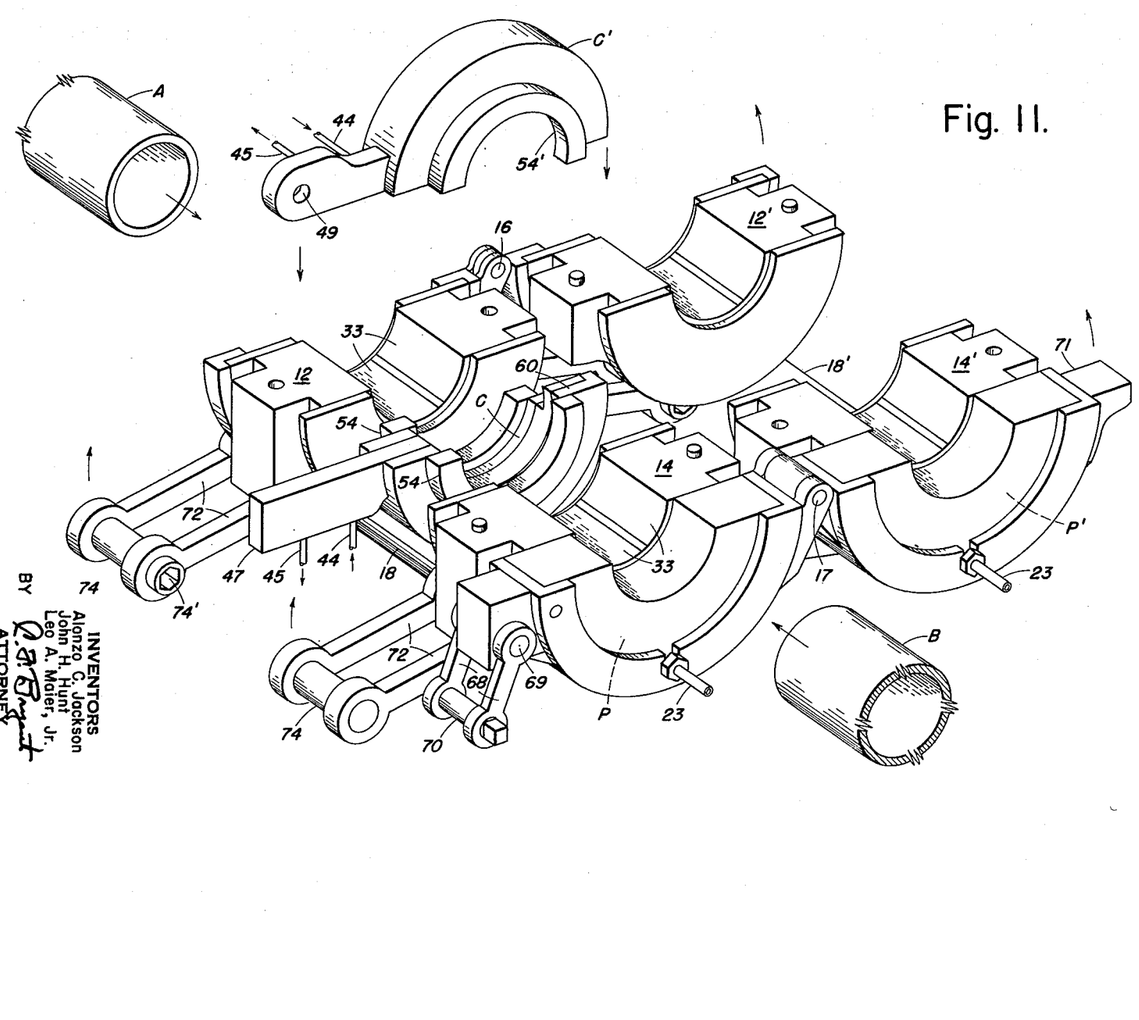
FIG. 11 is a similar perspective showing, on a partly exploded basis, of the FIG. 9 apparatus components when same occupy their hingedly-opened position.

The mode of attaching the upper coil half C' to the lower half C is more fully shown and described by the aforementioned copending application Serial No. 858,543. As shown in FIGS. 9, 11–14, the lower coil half C includes a current supply portion 47 while the upper coil half C' is hinged to a supply bus bar 48 for turning at proper times upwardly away from the pipe ends around pivot point 49. The other two ends of said lower and upper sections of C and C' have half of their widths cut away as shown in FIG. 11; and these mating portions are held in metal-to-metal electrical contact by suitable clamping means 118 (FIG. 12) disclosed and described by the copending application Serial No. 858,543. Such clamping means permit the lapped coil ends readily to be secured together and taken apart during operation of the apparatus.

Said two coil sections C—C' are connected with a source of heating current diagrammed in FIG. 9 as including a transformer 50 whose low voltage and high amperage secondary winding is directly joined with said coil ends via the connections 47 and 48 earlier mentioned. The primary winding of transformer 50 is energized from a high frequency generator generally designated at 52 in FIG. 9. Since such generators are well know, no attempt to illustrate details is here made.

Instead it will suffice to say that upon closure of a switch 53 generator 52 supplies transformer 50 with alternating current of a relatively high frequency typified by several thousand cycles per second (three to ten thousand may be taken as illustrative). The intensity of this heating current as transmitted by transformer 50 to inductor coil C—C' is adjusted so as to produce the requisite heating of tube ends A—B; this adjustment being accomplished at generator 52 in well known manner so as to heat the tube end metal to an intensity bright color during the welding cycle.

Before and during this welding cycle it is desirable to bathe the tube ends in a suitable protective atmosphere; and the coil C—C' provides improved chamber means for bringing such protective gas into contact with the weld metal parts prior to and during application of the inductive heating thereto. As here shown said chamber means take the form of ring inserts 54—54' which flank the two sides of the central inductor coil C—C' and fit closely around the tubes A and B as indicated in FIGS. 1 and 9. These side inserts 54—54' are more fully described in copending application Serial No. 858,543. By them there is formed all around the abutted tube ends and inside the coil C—C' a gas space shown at S in each of FIGS. 1 and 9.

Communicating with this space S are left and right supply tubes 56 (FIG. 9) through which protective gas from a supply source 57 is introduced into space S under the control of valve 58 and by way of header 128, all as copending application Serial No. 858,543 more fully explains. The opening of this valve 58 admits the protective gas into the circumferential space S around the tube ends A and B. Such admitted gas displaces the original air from space S and bathes the tube end metal in a manner preventing air contamination at the high temperatures encountered during welding.

The improved inductor coil C—C' here shown further includes means that serve to narrow the axial confines of the high frequency alternating magnetic flux which the energizing conductor passes through the abutted ends of tubes A and B for the purpose of inductively heating them to welding temperature. Such flux concentrating means are more fully shown and described by copending application Serial No. 858,543.

They take the form of U-shaped sections of magnetic material particles imbedded in a suitable binder, and encasing the two coil halves C—C' as shown at 60—60' in FIGS. 9 and 11. The binding substance in material 60—60' serves to insulate the individual magnetic particles one from another, and at the same time it provides for rapid conduction of heat through the material and into the same cooling passages 42 by which the temperature of coil C—C' is maintained within desired low limits.

Stated in another way, said passages 42 function in the coil organization here shown to carry heat away from the flux concentrating material 60—60' as well as away from the copper or other metal of which coil C—C' is formed. Such composition 60—60' has a very high electrical resistance and thus behaves as an insulator in the organization shown.

With these concentrator assemblages 60—60' positioned as represented around the outer periphery and along the left and right sides of inductor heating coil C—C', there are provided left and right side paths through which magnetic flux set up by passage of high frequency current through conductor C—C' is effectively transmitted to the metal in the aligned ends of tubes A and B. Such transmitted flux then returns to the inner portion of coil C—C' through the gap S shown by FIGS. 1 and 9 as separating the extreme end edges of said tubes A and B from the copper or other metal of the coil.

In this way the magnetic flux which serves to heat the ends of tubes A and B is effectively concentrated into the extreme edge portions of those ends with the desired narrowing of the heating band width. In consequence of such narrowing, objectionable flaring of the tube metal will not occur when these heated ends of tubes A and B are pressed together after the temperature thereof has been raised to welding value.

*Opening and closing clamp blocks 12 and 14 plus envelopes P—P' and coil C—C' as surrounded by shell structure 18—18'*

Once tubes A and B have been butt welded together by the improved apparatus of FIGS. 1 through 10, their removal from this apparatus requires that it be opened up in the general manner which FIG. 11 represents. This requirement exists even though the individual length of tubes A and B could be inserted into the shell assemblage 18—18' from the opposite ends thereof; for once those tubes have been welded together there is no other practical way to remove them from the assemblage except by opening up in the general FIG. 11 manner.

Our welding apparatus design here disclosed meets this requirement in a manner found to be eminently satisfactory; and some of the elements that contribute to such feature of ready opening and closing will now be examined.

Figure 12:
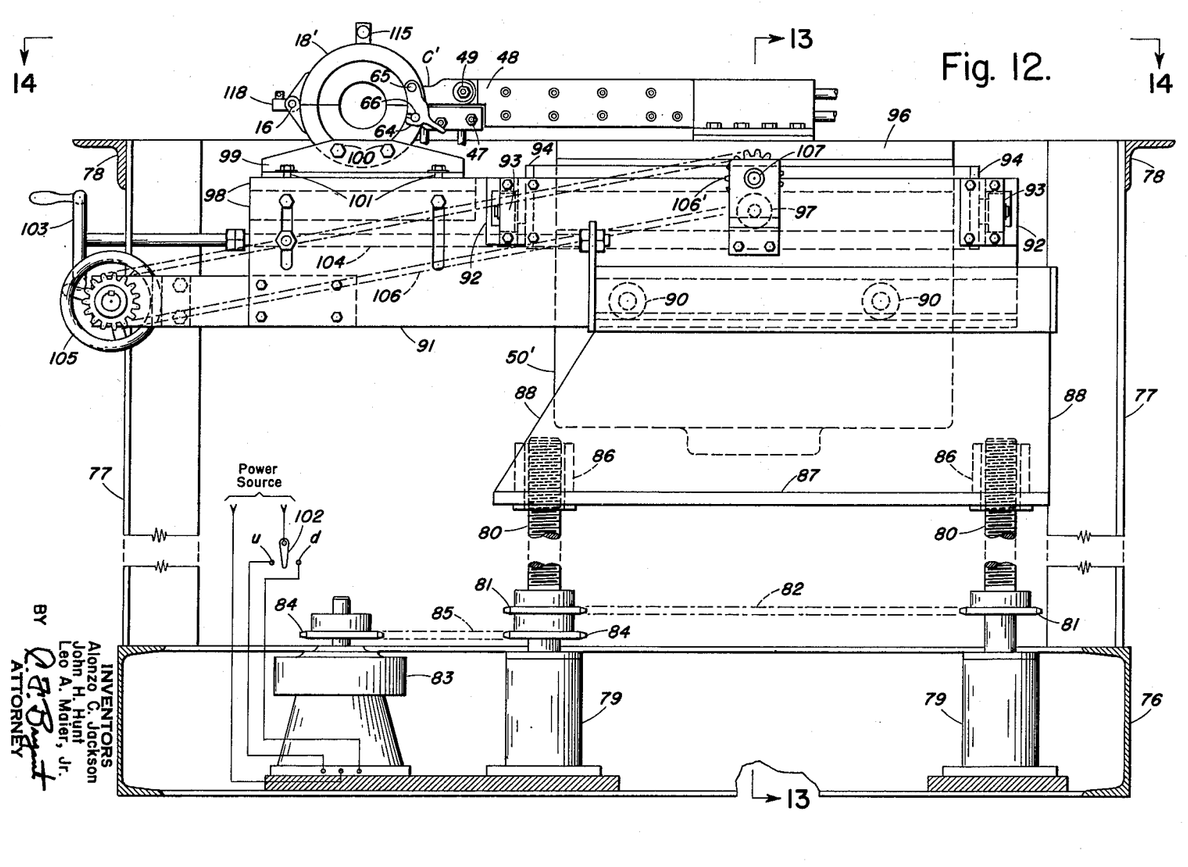
FIG. 12 is an end elevation of our improved mounting table upon which the pressure induction welding equipment of FIGS. 1–11 is mounted and supported in one representative application.

Starting with the open condition of FIG. 11, the tube ends A and B are first inserted into the lower half of the apparatus with their ends meeting midway of the inductor heating coil half C. The upper coil half C' (shown in exploded position by FIG. 11) actually is hinged to bus bar 48 as shown in FIG. 12, and now is swung downwardly around hinge point 49 to the FIG. 12 position where the free upper half end engages the free lower half end. A clamp 118 (FIG. 12) now is applied to those lapped ends and serves to secure them together in a manner giving good electrical contact. The shell 18—18' is cut away or scalloped out at both its front and rear sides (see top view of FIG. 14) so that said coil clamp 118 is free to protrude through such opening in the shell wall.

At this point, the upper shell half 18' is closed downwardly around hinge points 16 and 17 from the FIG. 11 open position to the closed position of FIGS. 1 and 9. This brings the top clamp halves 12' and 14' into cooperating relation with the lower clamp halves 12 and 14; and it also brings the expansible envelope half P' over and into cooperating relation with the lower envelope half.

The thus closed shell assemblage 18—18' now is secured at its left side by the closing of a latch shown at 64 in FIGS. 1, 9 and 12. Such latch is hinged to the upper shell half 18' at point 65 (FIG. 12) and by now engaging the pin 66 on the lower shell half 18 it secures the left shell ends together.

The right ends of shell half 18—18' are now similarly secured together by swinging the link pair 68 of FIG. 11 upwardly around pin 69 so that the pin 70 connecting the upper link ends slides over and engages a locking lug 71 carried by the upper shell half. This pin 70 is eccentrically shaped in the general manner of FIG. 4 whereby a turning thereof via the protruding square end (FIGS. 1 and 11) draws the lug 71 downwardly towards the lower shell half 18 thereby making the connection secure.

Each of the left and right clamp blocks 12—12' and 14—14' is provided with genrally similar link pairs 72 whose lower ends are hingedly attached to the lower block halves 12 and 14 by means of heavy pins 73. Such provision is made at both the front and rear sides of each clamp block 12 and 14, wherefore four sets of the link pairs 72 are involved. The top ends of each of these four link pairs are connected together via heavy top pins 74; and each of these four pins 74 has the eccentric shaping represented by FIG. 4.

With the two upper clamp block halves 12' and 14' closed down upon their mating block halves 12 and 14 as shown in FIG. 2, the forward and rearward link pairs 72 both are swung upwardly as shown by the arrows of FIG. 3 into engagement with cooperating shoulders on the top sides of the upper block halves. The condition at this point is as shown in FIG. 2.

A wrench (not shown) now is inserted into the hexagonal opening 74' of each pin 74 for the purpose of rotating the pin in a direction causing the eccentric part thereof to pull the top block shoulder therebeneath downwardly toward the lower clamp block half. Such pulling forces the top three clamp segments 32 downwardly upon the top half of the engaged tube A or B and thereby forces the lower half of the tube into similar intimate engagement with the three bottom clamp segments 32.

In his way the clamp block 12—12' forces its six shoes 33 firmly against the tube A, while the clamp block 14—14' similarly forces its six shoes 33 into firm contact with the tube B. By reason of the rugged construction of the parts just described, the clamping effectiveness is both high and dependable.

After the butt weld has been made along line 10 as shown in FIG. 10 (and by procedure to be described more fully), the opening of the top shell half 18' upwardly and away from the lower shell half 18 can be accomplished by operations which are reverse to those just described. The four eccentric pins 74 now are turned via the aforementioned wrench (not shown) so as to loosen the four sets of hinge block links 72 and permit the top ends of these links to swing downwardly away from the top clamp block halves 12' and 14', thereby freeing them from the lower clamp block halves 12 and 14.

Next the eccentric pin 70 is similarly rotated in the releasing direction and the link bar 68 swung downwardly and outwardly away from the lug 71 of the top casing for expansible envelope P'. This frees said top casing from the mating casing for lower expansible envelope P, and also frees the left end of top shell half 18' from the lower shell half 18. Finally the latch 64 on the right shell end is opened (see FIG. 12) thereby freeing the right end of top shell half 18' from the lower shell half 18.

Said top shell half 18' with upper clamp halves 12'—14' and upper envelope P', now can be swung upwardly around hinge points 16—17 from the closed position of FIGS. 1 and 9 to the open position of FIG. 11. At this point the inductor coil clamp 118 (FIG. 12) is opened thereby freeing the clamp end of upper coil half C' from its attachment to the clamp end of the lower coil half C. Said upper half C' now is free to be swung upwardly around hinge point 49 (FIG. 12) and away from the welded tubes A and B (FIG. 10).

The welding apparatus is now fully open at its top and the welded tube A and B thus can be freely removed from the apparatus parts that are contained in the lower shell half 18. Such removal places the apparatus in readiness to receive another pair of tube lengths (corresponding to A and B) which are to be welded.

*Welding unit mounting table of FIGS. 12–16*

For the purpose of supporting the welding unit shell 18—18' and the associated devices which FIGS. 1 through 11 represent, we provide the mounting table organization which FIGS. 12 through 16 show. This support assemblage utilizes a base frame 76 that rests upon the area floor or ground (FIG. 15), four upright angle irons 77 that extend upwardly from the four base corners, and four top angle irons 78 that join the top ends of corner members 77 and complete the table framework.

Disposed in the base 76 are three jack units 79 each comprising a vertical screw shaft 80 journalled in the jack base (FIG. 13) and arranged to be driven via sprocket 81 and chain 82 in either the clockwise or counterclockwise direction. A motor 83 supplies the driving movement through sprockets 84 and chain 85.

The upper threaded ends of the three jack shafts 80 engage with threaded members 86 (FIGS. 12–13) mounted as shown in the vertically adjustable carriage plate 87. Extending upwardly from the two sides of said plate are vertical members 88 carrying along their tops left and right horizontal tracks 89 (FIGS. 13–14).

Riding on these tracks 89 are left and right sets of side rollers 90. Carried by these side roller sets are left and right side plates 91 which extend upwardly therefrom as best shown by FIGS. 13–14. These side plates 91 in turn are joined together at the forward and rear ends by transverse mebers 92 in which forward and rear sets of rollers 93 ride (FIGS. 12–13–14). These two roller sets 93 respectively support forward and rear members 94 (FIG. 14) of an inner central assemblage that also includes side members 95 and a top slab of insulating material 96 which defines the top of the casing 50' (shown dotted in FIG. 12 and full lined in FIG. 13) for the transformer 50 of FIG. 9. The support organization is such that said transformer and casing 50' are suspended from their sides by means of the two tilt bearings which FIGS. 12–13–14 represent at 97.

Figure 13:
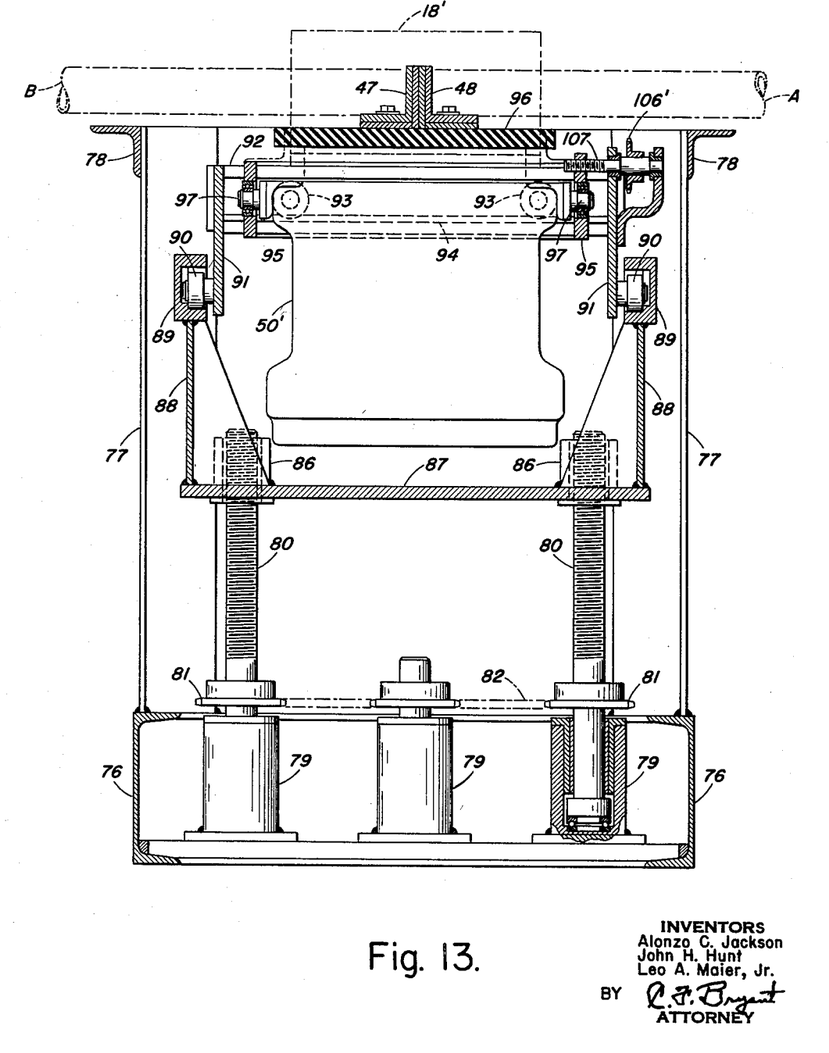
FIG. 13 is a view on line 13—13 of the FIG. 12 support table showing our provision for positionally adjusting the pressure welding assemblage and its power supply transformer in the up-and-down or vertical direction.
Figure 14:
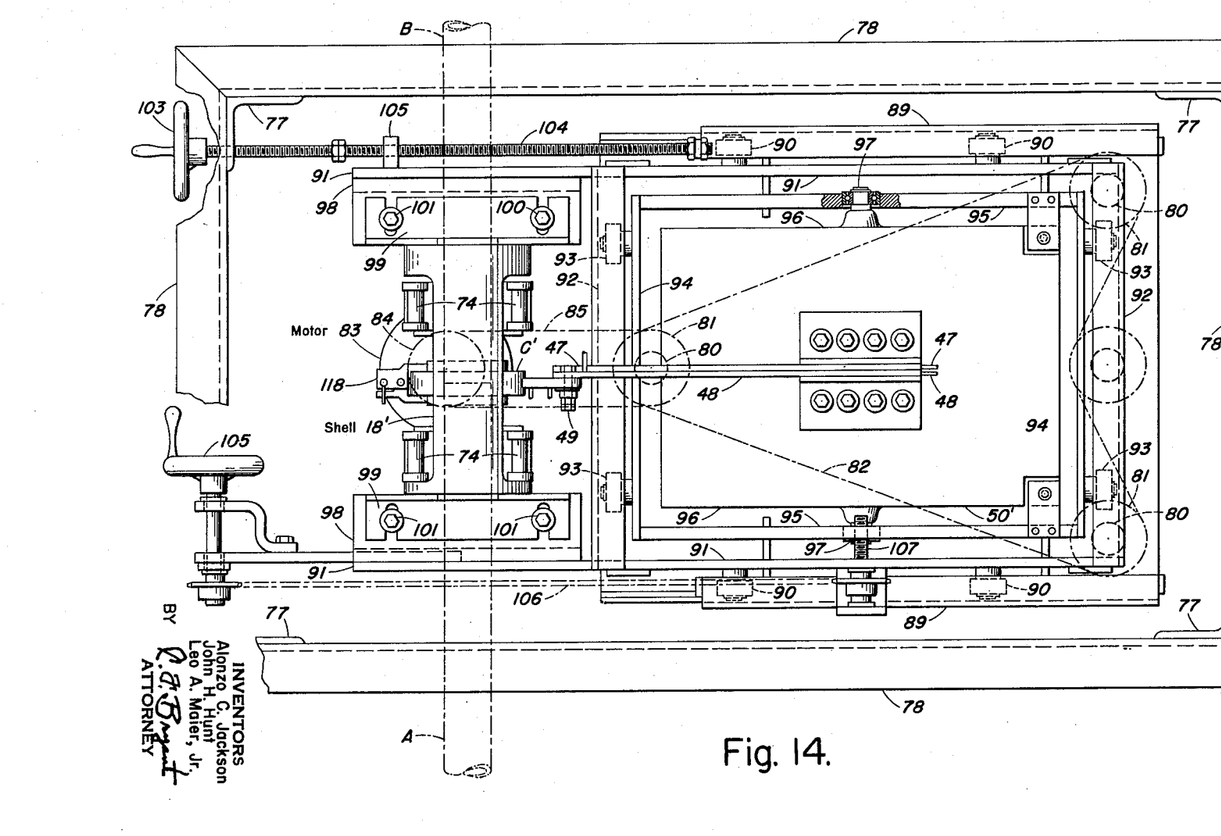
FIG. 14 is a top plan view from line 14—14 of FIG. 12 of this same induction welder and support table assemblage.

It will be seen from FIGS. 12–13–14 that the left and right side plates 91 extend beyond the confines of the transformer housing 50' and span the space which the welding unit 18—18' occupies. Said welding unit derives its support from these plate 91 extensions via left and right side tracks 89 which are attached to the inner faces of those plate extensions and the upper portions of which afford flat surfaces upon which left and right shell support feet 99 rest in the manner shown. The upstanding portions of these left and right feet 99 are secured to the left and right ends of shell half 18 via bolts 100. Other bolts 101 secure the feet 99 to the structural extensions 91.

When mounted in this manner, the welding unit shell 18—18' can be adjusted in any one or all of the three directions of up-and-down, sidewise left or right, and forward or back. The up-and-down adjustment is effected via jacks 79 and their driving motor 83. To move the welding assemblage up, a switch 102 of FIG. 12 is thrown to the left causing flow through point "u" of current which drives motor 83 in the forward direction to raise the elevation to carriage plate 87 and everything supported thereby including the welding unit 18—18'. Downward adjustment is similarly effected by shifting switch 102 to the right into contact with "d." This produces reverse rotation by motor 83 and a lowering of the welding unit assemblage 18—18'.

Forward and backward adjustment of the welding unit 18—18' is effected by turning a handwheel 103 and its threaded shaft 104. This produces forward or backward movement by lug 105 (FIG. 14) that is attached to one of the two side plates 91, threby causing the movable portion of the table assemblage (including welding unit 18—18') to ride on side rollers 90 in either the forward or backward direction as desired.

Lateral or side-to-side adjustment of the welding unit 18—18' is similarly effected by turning a handwheel 105 to drive a shaft 107 of FIGS. 12–13–14 through a chain 106 and sprocket 106'. Such driving causes the threaded portion of shaft 107 to communicate side-to-side adjusting movement to the engaged member 95, thereby causing the movable table structure to shift along rollers 93 in the lateral direction desired.

Again referring to FIGS. 12–13–14, the purpose of the tilt bearings 97 is to permit the inductor coil C—C' and its associated transformer casing 50' to "float" around those bearings into the position where the lower coil half C most accurately mates with the undersides of the abutted tube ends A—B in the welding unit shell 18—18'. This assures proper and accurate centering of the inductor coil around those abutted ends when the upper coil half C' later is closed down upon and clamped to the lower coil half C.

Figures 15, 16:
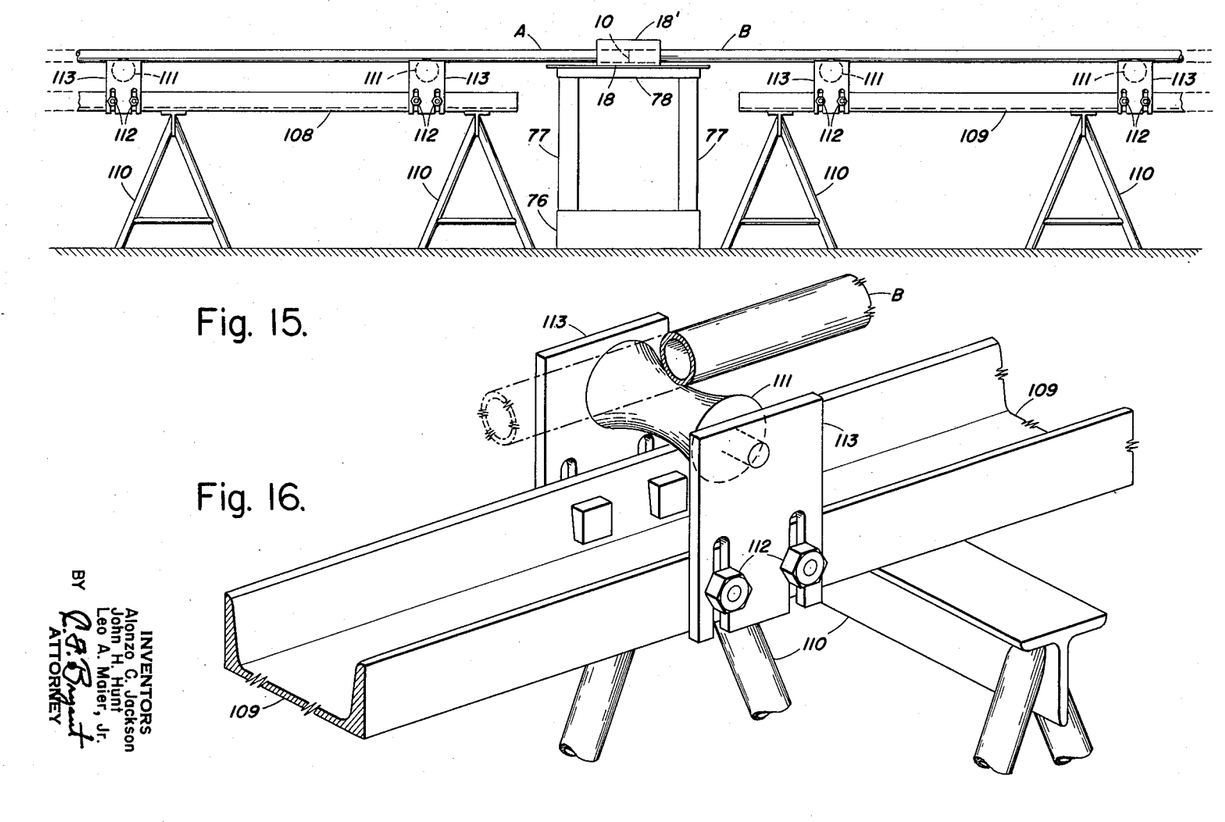
FIG. 15 shows how the two tubes A and B that are brought into the shell assemblage for butt welding together can be supported when considerable lengths thereof extend away from the welding equipment in both directions.
FIG. 16 is a showing in enlarged perspective of one of the tube support rollers that is utilized by the apparatus of FIG. 15.

Referring finally to FIGS. 15 and 16, we have there represented provision for handling long lengths of the tubing A and B when such long lengths are to be welded by the improved apparatus of our invention. Extending to the left and to the right of our welding unit 18—18' and its table 76—78 are two separate assemblages respectively including longitudinal members 108 and 109 maintained at the elevation shown via stands 110. Rollers 111 shaped as best shown in FIG. 16 are supported by each of these longitudinal members 108—109 at suitable intervals and in the manner shown; and it is upon these rollers that the pipe lengths A and B rest in the manner indicated.

Each of these rollers 111 can be shifted up or down upon loosening bolts 112 and suitably shifting the position of side bearing plates 113. Moreover the stands 110 can be located on their supporting floor in such a way as most effectively to align the tube lengths A and B with the welding unit shell 18—18' in which their ends are abutted incident to welding.

In cooperation with our table support means of FIGS. 12 through 15, these tube support facilities of FIGS. 15-16 permit extremely long lengths of tubing A and B to be handled effectively and satisfactorily. Rough or preliminary adjustments of the tubing alignment are effected by facilities 108—109 and the finer or final adjustments in alignment are achieved by the up-and-down and the front-and-back and the side-to-side positionings of the movable table structure which already have been explained.

It further is to be observed that the table structure of FIGS. 12-15 additionally serves to house the various valve and control elements which are indicated in FIG. 9 but which have not been fully represented in FIGS. 12-15. Such elements include the pressure fluid valves 28—29, cooling water valve 46, the gas supply valve 58, the power switch 53, and the associated relay 114 which is governed by weld-upset switch 115 provided at the top of the unit casing shell 18' as shown in FIGS. 8, 9 and 12.

*Operation of complete welding installation*

In utilizing the apparatus here disclosed for butt welding the ends of metal tubes A and B, these tubes first have their end faces machined clean just before placement of the tubes in their respective clamping blocks 12—12' and 14—14' where they are aligned in the general manner indicated by FIGS. 1, 9 and 12. These machined tube ends preferably are slightly beveled (though this is not imperative) so as to form an included angle of about 3° that opens towards the surrounding inductor coil C—C'.

Thus prepared, the two metal tubes A and B are secured in their clamp blocks 12—12' and 14—14' by the procedure already described, with the abutted ends preferably in direct physical contact (spacing one from the other by a very small axial distance also is permissible). At this point the alignment of the two tubes is made as perfect as possible by means of three table adjustments earlier described; and the inductor coil's lower half C is centered with respect to the weld line 10 by bringing it into the side-to-side position of FIG. 1 via a turning of the handwheel 105.

The top half C' of the inductor heating coil now is moved into place over the tube-end meeting line 10 and secured at its free end to the mating end of lower coil half C via clamp 118. Following this, the top shell half 18' is closed and the two clamps 12—12' and 14—14' plus expansible envelope sections P—P' are secured together and locked as earlier described.

The valve shown at 58 in FIG. 9 is now opened admitting protective gas from source 57 into the atmosphere spaces S around the tube ends A and B for flow into that space and over those ends. Such admission is continued for a time sufficient for the protective gas to replace all air from around the tube ends, and in this way objectionable oxidation of the metal end surfaces is prevented during later heating of the tube ends to welding temperature.

At the same time water or other cooling fluid is made available to the inner passages 42 of the inductor coil sections C—C' and the flux concentrator elements 60—60' integral therewith. This is done by opening valve 46 of FIG. 9. Also, the amount of weld upset travel desired is preset at switch 115 by adjusting the position of actuator element 119 in its carrying bolt 116. An upset value or total shortening of the two tubes A and B, of from one sixteenth to five thirty seconds inch ordinarily is found to be satisfactory.

The connection of high frequency generator 52 to transformer 50 now is completed at switch 53 thereby causing flow through the upper and lower coil sections C—C' of high frequency alternating current which is effective to heat the extreme end portions of tubes A and B to welding temperature. Such temperature may be of the order of 2300 to 2400° F. and it is accompanied by an intensely bright glowing of the heated tube metal.

Pressured fluid has in the meantime (as before starting the heating current) been admitted through valve 28 of FIG. 9 (with valve 29 now being closed) into the expansible envelopes P—P' for the purpose of forcing tube B against the end of tube A with pressure adequate to meet welding requirements. In the case of conventional ferritic steels such as of the "carbon" variety, such pressure is of the order of 5500 pounds per square inch of tube face area; while for high-alloy stainless steels a higher pressure of from 8000 to 8500 pounds per square inch of tube face area ordinarily is required.

Involved in the application of this pressure is an expansion of the envelopes P—P' from the contracted condition of FIG. 7 to the expanded condition of FIG. 8. The resultant pressure between the abutted tube ends A and B when accompanied by application of heat from coil C—C' effects between those ends a weld connection of the type represented in FIG. 10. Here the tube end metal is upset to the moderate extent indicated with some thickening of the weld junction 10 over and above the thickness of the tube wall portions on either side of said weld junction 10.

Once the weld of FIG. 10 has been completed, the heating current and the pressure fluid plus inert gas and cooling water supplies can be turned off either manually on an individual basis or automatically under the control of the weld-upset switch 115 earlier mentioned. Prior to making the weld, this switch has the unactivated condition shown by FIG. 9 wherein its contact is open. During the movement of tube B towards tube A which takes place during the welding, the clamp block 14—14' moves from its FIG. 7 starting position into the weld-completed position of FIG. 8; and in so doing the bolt 116 and actuator 119 of FIG. 9 engage the switch stem 117 with an accompanying closing of contact 115.

Through the associated relay 114 such closing shuts off the pressure fluid flow into expansible envelope P—P' by closing supply valve 28 and opening exhaust valve 29. This stops the upset action at the weld juncture. If desired this same relay 114 also may be used to disconnect at 55 the transformer 50 from its high frequency generator 52, thereby stopping supply of heating current to the inductor coil C—C'. Said same relay 114 further may be used to shut off the supply of protective gas by closing valve 58, and also to shut off the cooling water supply by closing valve 46. In FIG. 9, these various additional functions are schematically indicated by the dotted lines that extend from relay 114.

It further will be understood that in an actual installation control means can and generally will be provided for turning on all of the several supplies as required at the start of each welding cycle. Such start-up control means however are not represented here.

The FIG. 10 weld juncture of tubes A and B having been accomplished, the top half 18' of the unit shell is opened via the procedure already explained. The top half C' of the inductor coil next is freed at clamp 118 and swung upwardly around hinge point 49, and the welded-together pipe lengths A and B are then removed from the lower shell half 18. Incident to such removal, the entire lower shell half 18 with its carried clamp halves 12 and 14 may if desired be physically lowered below the welded tubes A and B as supported by the FIG. 15 members 108—109. This is accomplished by running motor 83 of FIG. 12 in the reverse direction, thereby causing jacks 79 to move carriage plate 87 downwardly.

The foregoing completes the weld cycle and places the equipment in readiness for butt welding another pair of pipe ends corresponding to A and B.

In certain instances it may be desirable to have inductor coil C—C' continue the heating current after the weld joint of FIG. 10 has been completed. Such prolonged heat application to the tube juncture area is spoken of as "soaking," and it serves the useful purpose of allowing grain growth across the metal interfaces to take place. In such an event the weld pressure exerted by envelopes P—P' will be shut off as soon as the upset of FIG. 10 has been reached and only the heating current thereafter continued at such reduced value as may be needed to hold temperature.

For those instances where such "soaking" is required, the control organization of FIG. 9 can be modified so that the upset switch 115 acting through relay 114 will cut off only the pressure fluid to P—P' and protective gas supply while permitting reduced energization of the inductor coil C—C' to continue for some appropriate "soaking" period such as one minute or more. At the end of that further period the power switch 53 also can be opened.

*Summary*

In practice, highly successful results are obtainable from use of the novel tube-end welding apparatus herein described. Boiler and other tubes of conventional ferrous and stainless steel composition and of a wide variety of diameters and wall thickness can in this way satisfactorily be joined to each other and to tubes of differing material without objectionable flaring of the tube end metal at the junction 10 (FIG. 10). It is found by conventional test that the weld metal in the juncture area 10 has strength and durability at least as great as that of the metal in the unwelded portions of the tubes.

Because of its extreme compactness and ruggedness, the improved apparatus 18—18' of our invention lends itself admirably for use at the side of field installations as well as in the fabrication shop. A further significant advantage comes from the novel inductor coil C—C' construction which permits the flux concentrating material 60—60' to be cooled by the same fluid ducts 42 as cool the coil metal. Heretofore the facilities for concentrating flux to the extreme tube ends were not usable with gas chamber means of the preferred form here shown and could not be left in the assemblage from one welding cycle to the next. In the improved apparatus here disclosed such limitation is completely overcome and the usefulness and flexibility of the equipment correspondingly broadened.

Our inventive improvements are therefore extensive in their application and are not to be restricted to the specific form here disclosed by way of illustration.

What we claim is:

1. In apparatus for butt welding the ends of metal tubes, first and second sets of clamp blocks for engaging the two tubes and holding the ends thereof aligned and abutted, tie structure carrying said two clamp block sets in axially spaced disposition and serving to mount one set in a way that restrains it against axial movement while mounting the other set in a way that permits it to move axially towards and away from the restrained block set, an expansible envelope member also carried by said tie structure and flanking said movable clamp block set on the side thereof away from the restrained block set, an inductor heating coil located between the two clamp block sets where it is adapted to encircle the edge portions of said abutting tube ends and functioning when energized to set up in those ends a field of high frequency alternating magnetic flux that imparts inductive heating thereto, and means for admitting into said expansible envelope member a pressure fluid which by urging said moveable clamp block set towards the restrained clamp block set forces the heated ends of said abutted tubes together with the pressure needed to effect welding of those ends, said expansible envelope member and the said two clamp block sets being divided along a generally common central plane into cooperable upper and lower parts, and all of those upper parts being arranged to be openable away from said lower parts so as to permit abutted tube lengths that have been welded together to be taken out of the apparatus upon completion of the welding cycle.

2. Apparatus as defined by claim 1 wherein said expansible envelope member and the said two clamp block sets all are divided along a generally common central plane into cooperable upper and lower parts, and further wherein the recited tie structure takes the form of a generally cylindrical shell which is split into upper and lower halves with its lower half carrying all of said lower parts and its upper half carrying all of said upper parts, all of the so-carried upper parts in the upper shell half being openable away from the so-carried lower parts in the lower shell half thereby permitting welded-together tube lengths to be taken out of the apparatus upon completion of the welding cycle.

3. In apparatus for butt welding the ends of metal tubes, the combination of first and second sets of clamp blocks each made up of separable lower and upper parts with the two sets being adapted respectively to engage the two tubes so as to hold the ends thereof aligned and abutted; tie structure carrying said two clamp block sets in axially spaced disposition and serving to mount one set in a way that restrains it against axial movement while mounting the other set in a way that permits it to move axially towards and away from the restrained block set; releasable link means provided both at the front and at the back of the upper and lower parts of said first clamp block set and of said second clamp block set and serving to secure those upper and lower block parts together at proper times, each of said link means being equipped with an eccentric tightening pin effective upon turning to exert radial force between its associated clamp block parts and the tube surrounded thereby; an inductor heating coil located between the clamp block sets where it is adapted to encircle said abutting tube ends and functioning when energized to set up in those ends a field of high frequency alternating magnetic flux that imparts inductive heating thereto; and an expansible member also carried by said tie structure and organized to move said second clamp block axially closer to said first clamp block upon expansion of the member when pressure fluid is admitted thereinto, said movement forcing the heated ends of said abutted tubes together with the pressure needed to effect welding of those ends, said tie structure also being made up of separable lower and upper parts.

4. In apparatus for butt welding the ends of metal tubes, the combination of first and second sets of clamp blocks each comprising separable lower and upper parts with the two sets being adapted respectively to engage the two tubes so as to hold the ends thereof aligned and abutted; tie structure in the form of a cylindrical shell split into lower and upper halves that are hingedly secured together along one axial side and that are openable away from each other along the other axial side, said lower shell half carrying said lower clamp block parts and said upper shell half carrying said upper clamp block parts with those first-set parts being restrained by the shell against axial movement and those second-set parts being free to move in the shell towards and away from the first-set parts; separable lower and upper expansible envelopes carried in the lower and upper shell halves on the side of said second-set clamp block parts that is remote from the first-set block parts and in flanking relation to those second-set parts, said lower and upper envelopes being formed of rubber-like resilient material surrounded by and encased in their carrying shell halves and serving when expanded to move the second-set block parts axially towards the first clamp block parts; an inductor heating coil located between the two clamp block sets where it is adapted to encircle said abutting tube ends and functioning when energized to set up in those ends a field of high frequency alternating magnetic flux that imparts inductive heating thereto; and means for admitting into said lower and upper envelopes a pressure fluid which by expanding the envelopes advances the second clamp block set closer to the first and thereby forces the heated ends of said abutted tubes together with the pressure needed to effect welding of those ends.

5. Apparatus as defined by claim 4 wherein releasable latch means provided at the two ends of the recited shell serve to secure the said upper and lower halves of that shell together along their openable axial side at proper times, and further wherein releasable link means provided bith at the front and at the back of the recited upper and lower parts of said first clamp block set and of said second clamp block set serve to secure those upper and lower block parts together at propertimes, each of said link means for the clamp block sets being equipped with an eccentric tightening pin effective upon turning to exert radial force between its associated clamp block parts and the tube surrounded thereby.

6. In an installation for butt welding the ends of first and second metal tubes, the combination of a welding unit made up of two clamp blocks for receiving and engaging the two tubes plus tie structure serving to mount said blocks plus an inductor heating coil located between said tube clamp blocks adapted to encircle and heat the tube ends as they abut between the blocks plus expansible means for moving the clamp blocks towards one another and applying welding presure to the heated tube ends, the foregoing parts being made of separable elements such that they are openable upon completion of each welding cycle in a way fully releasing the welded-together tubes for removal from the unit; a support table for said welding unit; a carriage in said table serving to support said unit and being effective during the welding cycle to hold the unit with its central axis above the table top whereby lengths of said first and second tubes meeting in and weldable together by the unit then are restable upon the surface of said top or are held thereabove by the unit; and means included in said table for adjusting the elevation of said carriage and supported welding unit in the lowering as well as in the raising direction, whereby upon completion of each welding cycle and opening of the welding unit in the manner aforesaid such opened unit is lowerable by the carriage below the table top surface and completely away from the welded-together tube lengths as same rest upon that top surface after such unit lowering.

7. An installation as defined by claim 6 wherein tube-length support stands having means for adjusting the height thereof are provided on the two sides of the recited welding unit table in general axial alignment with the welding unit center line, and further wherein provision is made in said table for adjusting the said carriage and supported welding unit forwardly and backwardly with respect to said table top surface, as well as upwardly and downwardly.

8. An installation as defined by claim 6 wherein tube-length support stands having means for adjusting the height thereof are provided on the two sides of the recited welding unit table in general axial alignment with the welding unit center line, and further wherein provision is made in said table for adjusting the said carriage and supported welding unit from side to side with respect to said table top surface, as well as upwardly and downwardly.

References Cited in the file of this patent

UNITED STATES PATENTS

| | | |
|---|---|---|
| 1,063,999 | Murray et al. | June 10, 1943 |
| 2,270,766 | Pierce | Jan. 20, 1942 |
| 2,892,914 | Rudd | June 30, 1959 |
| 2,919,335 | Shaughnessy | Dec. 29, 1959 |